United States Patent
Watkins

[19]

[11] Patent Number: 6,105,997
[45] Date of Patent: Aug. 22, 2000

[54] STROLLER ARRANGEMENT

[75] Inventor: Mervyn M. Watkins, Rancho Palos Verdes, Calif.

[73] Assignee: Convaid Products, Inc., Torrance, Calif.

[21] Appl. No.: 08/946,302

[22] Filed: Oct. 7, 1997

Related U.S. Application Data

[60] Provisional application No. 60/030,778, Nov. 13, 1996.

[51] Int. Cl.7 ........................................................ B62B 1/00
[52] U.S. Cl. ........................... 280/649; 280/650; 280/642; 280/42
[58] Field of Search ............................... 280/649, 30, 647, 280/650, 642, 42; 297/45

[56] References Cited

U.S. PATENT DOCUMENTS

| | | | |
|---|---|---|---|
| 3,784,252 | 1/1974 | Peterson | 297/364 |
| 4,094,531 | 6/1978 | Cabagnero | 280/649 |
| 4,232,897 | 11/1980 | Maclaren et al. | 297/45 |
| 4,335,893 | 6/1982 | Carmichael et al. | 280/42 |
| 4,353,577 | 10/1982 | Giordani | 280/642 |
| 4,398,748 | 8/1983 | Duvignacq | 280/644 |
| 4,538,830 | 9/1985 | Nakao et al. | 280/647 |
| 4,544,178 | 10/1985 | Al-Sheikh et al. | 280/642 |
| 4,618,184 | 10/1986 | Harvey | 297/19 |
| 5,641,170 | 6/1997 | Helm | 280/30 |
| 5,772,735 | 6/1998 | Espenshade | 280/643 |

FOREIGN PATENT DOCUMENTS 2091171  7/1982  United Kingdom .

*Primary Examiner*—J. J. Swann
*Assistant Examiner*—James S. McClellan
*Attorney, Agent, or Firm*—Oppenheimer Wolff & Donnelly; Christopher Darrow

[57] ABSTRACT

A base "X" frame is provided in which the arms of the "X" frame are pivotally coupled together at the mid-points thereof for folding from an extended "X" configuration to a laterally folded "X". The "X" frame is generally in a horizontal orientation in the use position of the stroller. A main seating support frame of a generally inverted "U" shape, is provided with the open end of the main seating support frame being pivotally coupled to the front of the base "X" frame. A support structure is also provided, pivotally coupled at the rear of the base "X" frame and pivotally connected to the main seating support frame. A rigid latch is provided to maintain the stroller in a use condition, the latch being releasable to allow the base "X" frame to collapse laterally and simultaneously allow the main seating support frame and primary support frame to collapse vertically against one another and against the laterally collapsed base "X" frame for storage or transport.

13 Claims, 5 Drawing Sheets

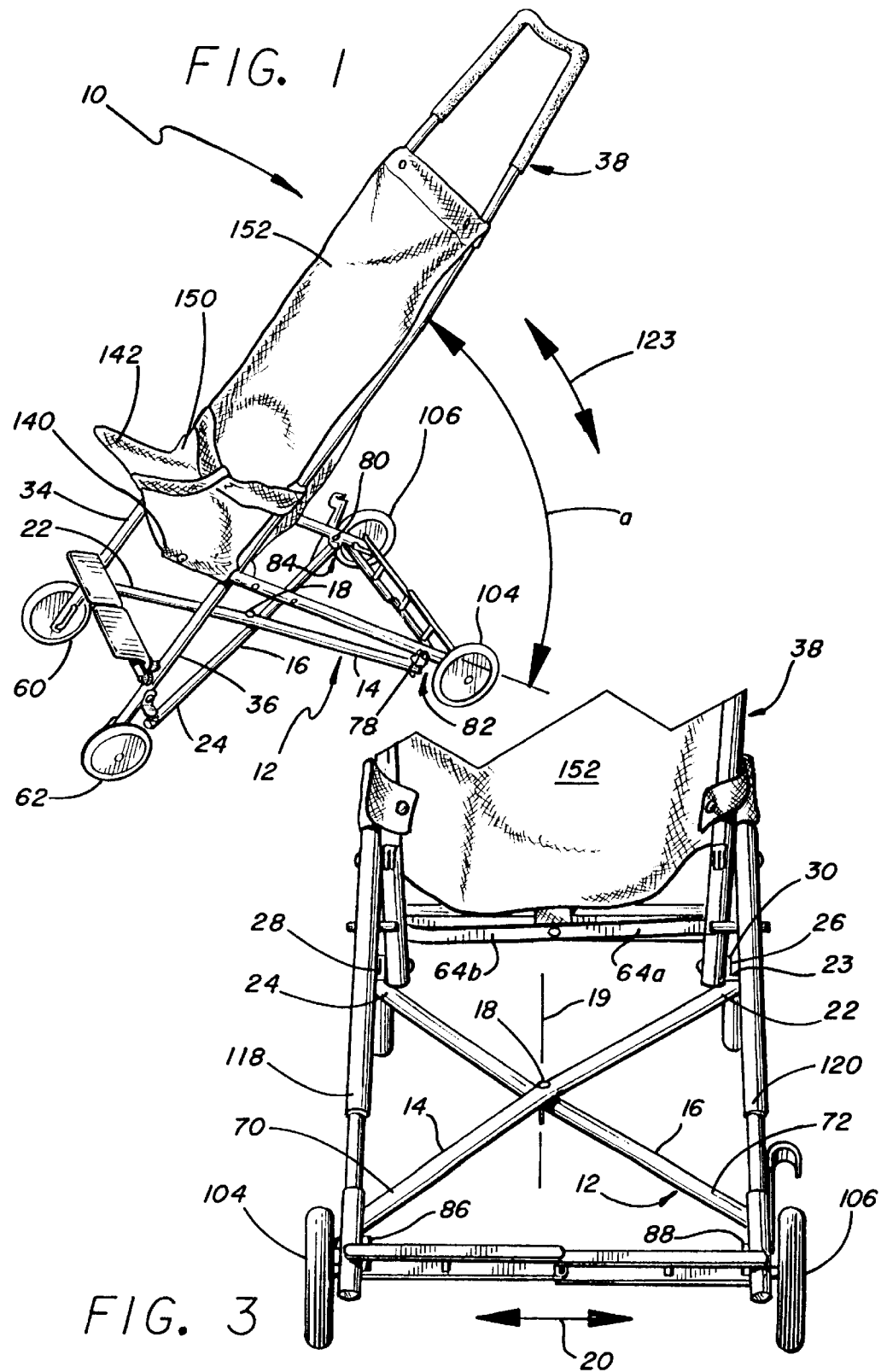

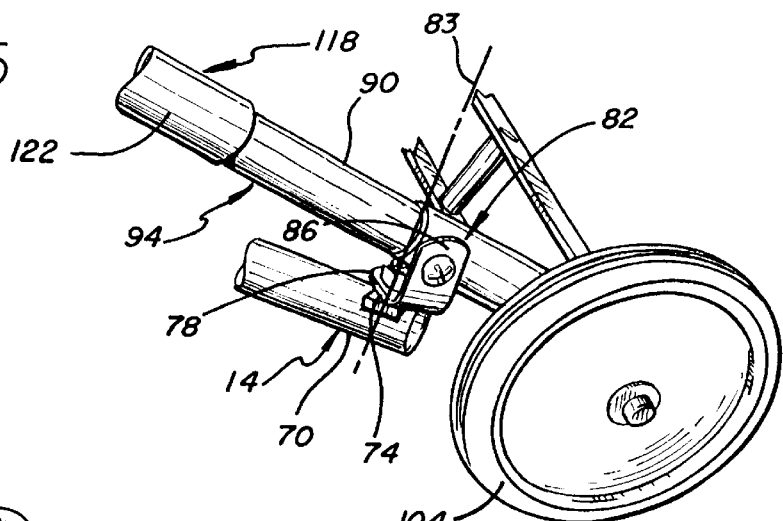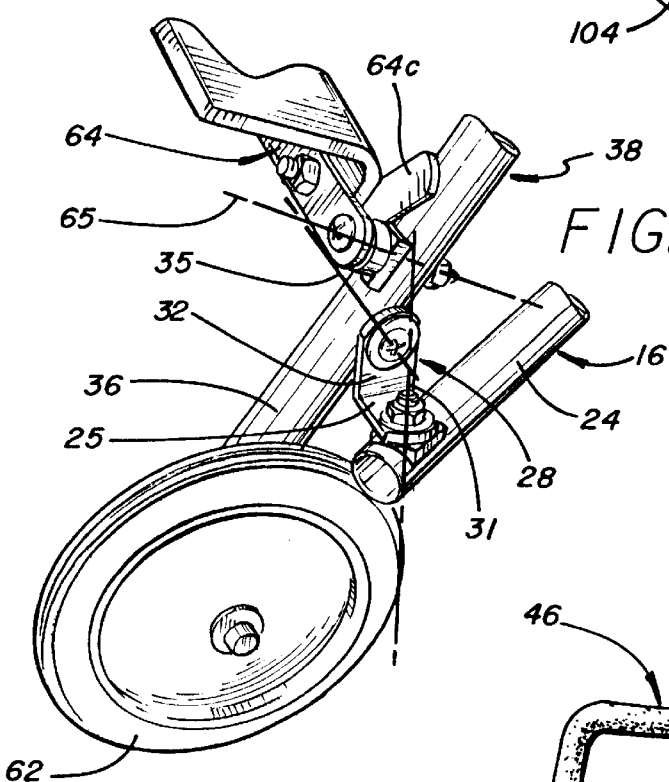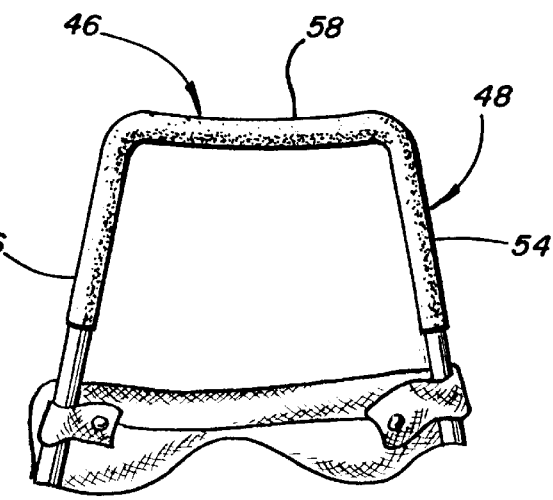

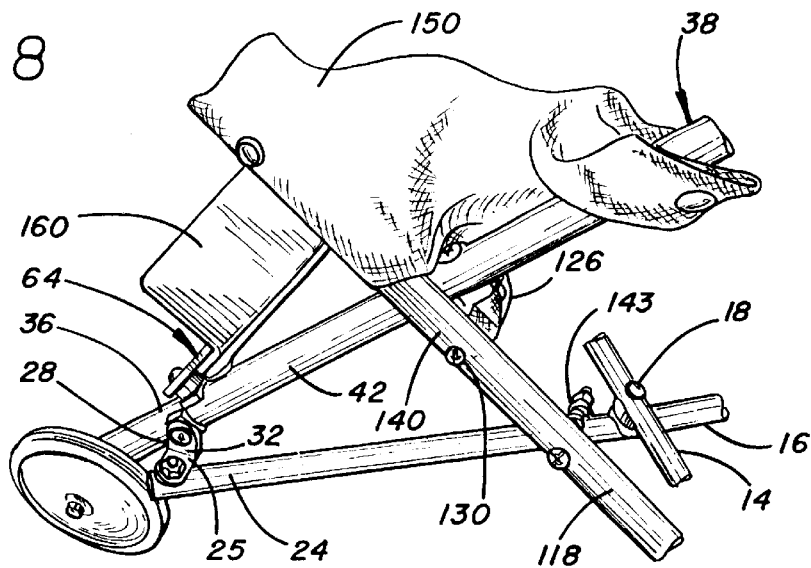
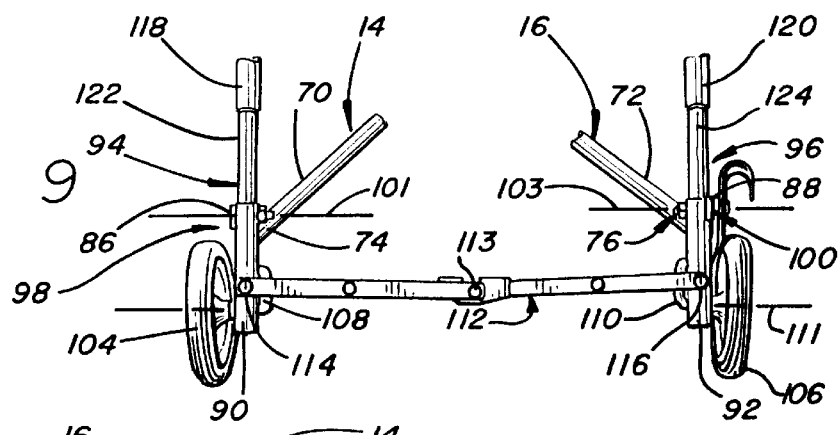
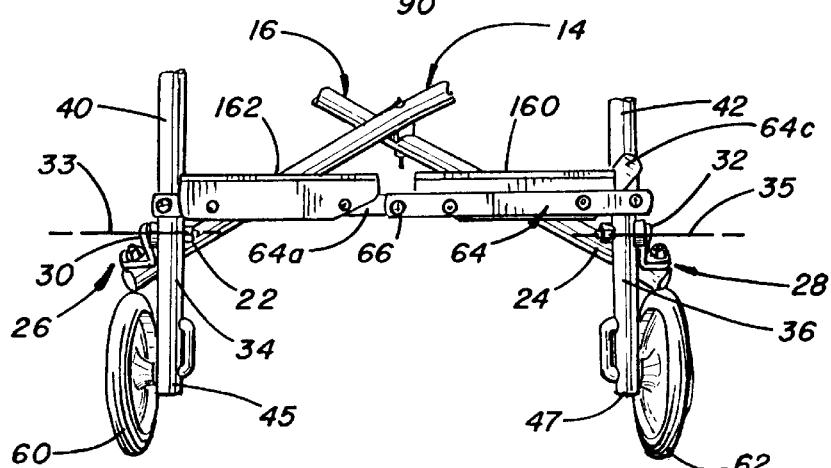

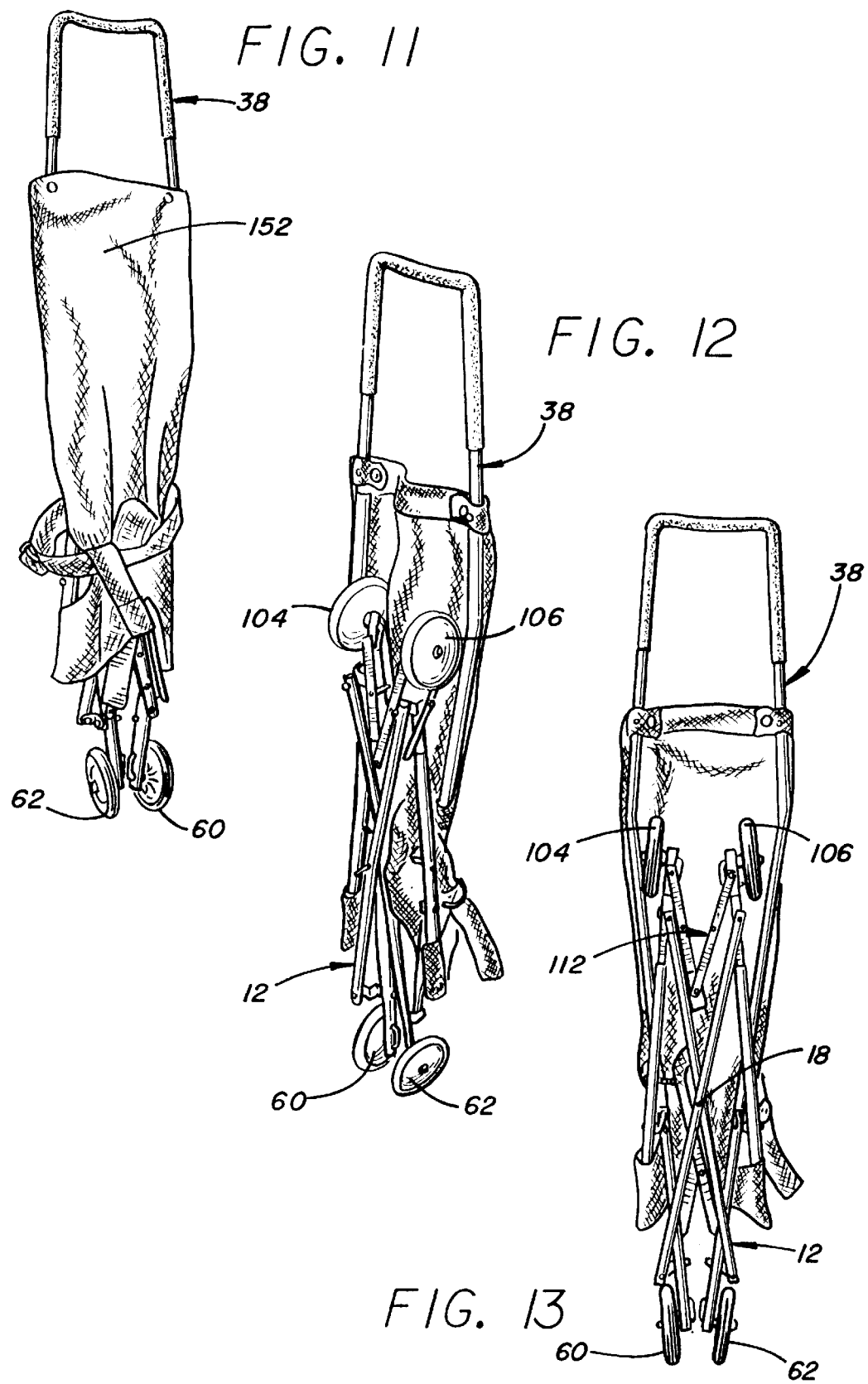

STROLLER ARRANGEMENT

CROSS-REFERENCE TO RELATED APPLICATION

This is a completion of my U.S. Provisional Application No. 60/030,778 filed Nov. 13, 1996.

BACKGROUND OF THE INVENTION

1. Field of the Invention

This invention relates to the stroller art and more particularly to a foldable and tiltable stroller which may be folded into a compact configuration.

2. Description of the Prior Art

Prior art folding strollers such as that disclosed in my prior U.S. Pat. No. 3,995,882 have been used for the transport of children, invalids, persons paralyzed or suffering from some debilitating disease or condition, and persons too young or somehow incapacitated from walking unassisted, and in othe desired applications. Often it is desirable to have the stroller foldable to allow the stroller to be conveniently stored and transported when not in use. Such storage may be, for example in the trunk of a car, under a bed, in a closet, or the like. Further, it is also often desirable to have the seating portion of the stroller, which includes the seat support and the back support, tiltable with respect to the supporting frame so as to provide various angular relationships of the seating portion with respect to gravity for more comfort and convenience.

While prior art strollers have included mechanisms for folding from the upright position to a generally horizontal position, such strollers have not been laterally foldable or collapsible to provide a more compact configuration for storage when not in use. Further, if the person being so transported in the stroller falls asleep, a more recumbent position may be desired than is provided in the upright seating condition. Additionally, when the stroller is pushed over or down some obstruction, such as a curb or the like, it is desired for both comfort and safety to shift the center of gravity of the combined person and stroller so that the person does not fall from the stroller or undergo the sensation of being about to fall from the stroller. The seat and back support structures must, at all times during use, provide secure seating conditions regardless of the relative movement thereof with respect to the supporting frame. For convenient use, the weight of the entire structure must be kept to a minimum consistent with the safety requirements so that it may be easily carried, moved and placed into and removed from a storage location by one person.

SUMMARY OF THE INVENTION

Accordingly, it is an object of the present invention to provide an improved foldable stroller.

It is another object of the present invention to provide a foldable stroller which is laterally foldable or collapsible as well as foldable or collapsible into a horizontal configuration.

It is another object of the present invention to provide a stroller foldable into a compact configuration when not in use and having a tiltable seating portion when in use.

It is yet another object of the present invention to provide a stroller having a seating position lockable at selectable tilted positions.

While the present invention has particular utility in the field of folding strollers, such application is not limited, since the principles of the present invention may be adapted to wheelchairs and other mobile seating arrangements. The following description showing the adaptation of the present invention to a folding stroller is for purposes of illustrating the broad application of the structure of the present invention.

The above and other objects of the present invention are achieved, according to a preferred embodiment of the present invention, by providing a base "X" frame in which the arms of the "X" frame are pivotally coupled together at the midpoints thereof for folding from an extended "X" configuration to a laterally folded "X" configuration.

In the extended "X" position, the remote lateral ends of the arms are spaced at their maximum separation. The extended position is the position in which the stroller is in use.

In the folded "X" position, the lateral ends of the arms are brought into a closely spaced configuration. The folded "X" position is desired when the stroller is stored.

The "X" frame is generally in a horizontal orientation in the use position thereof, generally adjacent and spanning between the front and rear wheels of the stroller. The forward end of each of the arms of the "X" frame is pivotally connected to one leg of an angle bracket, and the other leg of each angle bracket is pivotally connected to a respective lower portion of a main seating support frame.

The main seating support frame is of a generally inverted "U" shape, with the open end of the main seating support frame being the lower portion thereof. The upper or closed end of the "U" shaped main seating support frame is provided with adjustable means for allowing the ends of the arms of the "U" to move toward and away from each other as the stroller is moved between the use and folded positions. Such adjustable means may be a resilient member, a telescoping member, or other desired structure for achieving the purpose of allowing such movement. In the use position, the main seating support frame is at a predetermined angle to the "X" frame and provides the rigid support for the seating portion.

Front wheels are rotatably mounted on the lower ends of the main seating support frame in regions spaced from the connection of the front angle brackets thereto.

An overcenter hinge means is pivotally coupled to the lower ends of the main seating support frame and extends therebetween. The pivot point of the overcenter hinge means is intermediate the open ends of the arms of the main seating support frame and the forward ends of the arms of the "X" frame to enable both the "X" frame and the overcenter hinge means to fold, or collapse, simultaneously. In the use position, the overcenter hinge means is in the extended position, and when the stroller is folded the outer portions of the overcenter hinge means pivot on the lower ends of the main seating portion and with respect to each other and move towards each other, for moving the remote ends of the main seating support frame arms toward each other and the forward ends of the "X" frame toward each other as the "X" frame pivots about its center or hinge pivot point.

The overcenter action provides a desired and secured latched retention of the stroller in the use position while still allowing folding to take place as desired. One of the hingeable members of the overcenter hinge means is extended beyond its hinge point so as to provide a handle for the user to move the hinge point toward the handle end of the main seating support frame and thereby release the overcenter latch.

The rear end of each of the arms of the "X" frame is pivotally connected to one leg of a rear angle bracket, and the other leg of each rear angle bracket is pivotally connected to a respective lower end of a primary control rod. Rear wheels are rotatably mounted on the lower ends of the primary control rods. A rear overcenter locking hinge means is pivotally coupled to the lower ends of the primary control rods and extends between the rear ends of the arms of the "X" frame with the hinge pivot intermediate the lower ends of the primary control rods and the rear ends of the arms of the "X" frame to enable both the "X" frame and the rear locking hinge means to fold, or collapse, simultaneously. The hinge action of the locking hinge moves the rear ends of the "X" frame and the lower ends of the primary control rods towards and away from each other as the "X" frame pivots about its central pivot point. The locking hinge means provides the desired bracing of the stroller in the use position. However, when the stroller is to be folded, or collapsed, for transport or storage, a small forward movement of the hinge point of the locking hinge releases the overcenter lock.

Secondary control rods are telescopically mounted on the front ends of the primary control rods for sliding axial movement with respect thereto. Forward ends of the secondary control rods are pivotally connected to first legs of connection brackets for pivotal movement, and the connection brackets are coupled to the arms of the main seating support frame.

Detents are provided in the primary control rods and spring loaded pins are provided on the secondary control rods for selective engagement with the detents. Outer ends of the secondary control rods extend forwardly of the arms of the main seating support frame and provide connection for the seat support, which may be a cloth, plastic, or other flexible material, mounted on the outer ends of the secondary control rods. The back support, which may also be cloth, plastic or some other desired flexible material, is mounted on the arms of the main seating support frame and extends between the connection brackets and the closed end of the main seating support frame. Foot rests may be provided on the front overcenter hinge means for support of the feet of the user.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 1 is a perspective view of one embodiment of a stroller according to the principles of the present invention;

FIG. 3 is a partial rear elevational view of the stroller arrangement;

FIG. 5 is a partial perspective view of the left rear portion of the stroller arrangement;

FIG. 6 is a partial perspective view of the left front portion of the stroller arrangement;

FIG. 7 is a partial rear view of the top of the stroller arrangement showing the construction and arrangement of the handle for the stroller arrangement;

FIG. 8 is a partial left rear perspective view of the middle and front portion of the stroller arrangement;

FIG. 9 is a partial rear elevational view of the stroller arrangement showing the rear overcenter locking hinge means;

FIG. 10 is a partial front elevational view of the stroller arrangement showing the front overcenter locking hinge means;

FIG. 11 is a front perspective view of the stroller arrangement in accordance with the present invention in the folded or collapsed condition;

FIG. 12 is a right bottom perspective view of the folded stroller arrangement; and FIG. 13 is a bottom elevational view of the folded stroller arrangement.

DETAILED DESCRIPTION OF THE PREFERRED EMBODIMENTS

Figure 4:
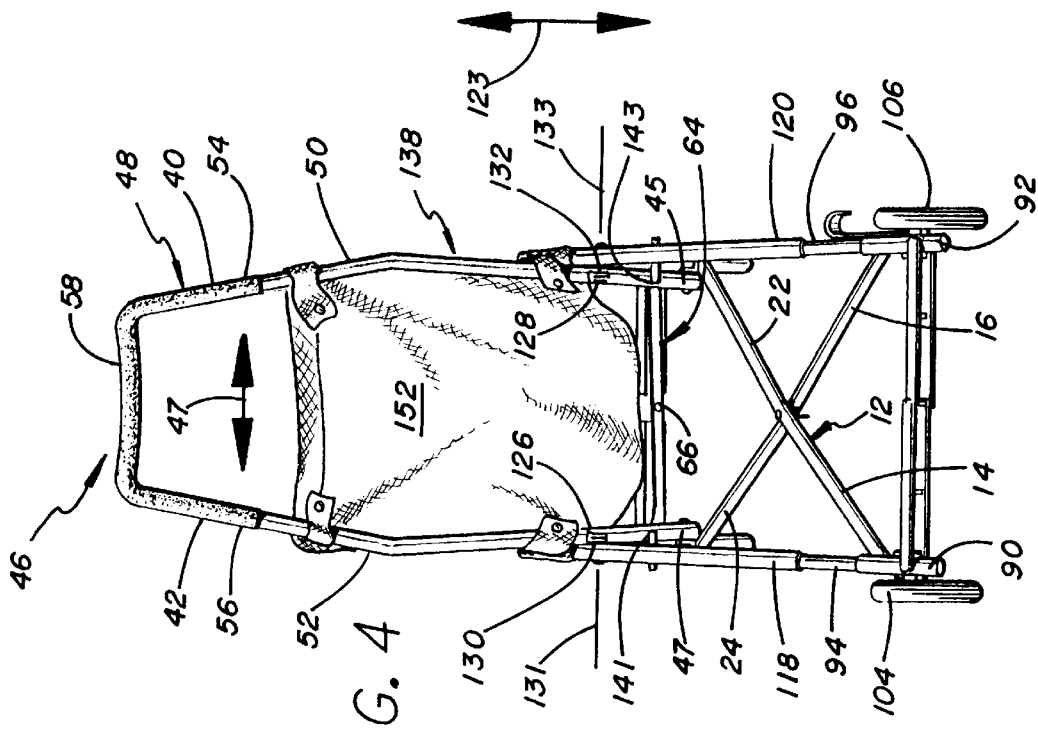
FIG. 4 is a full rear elevational view of the stroller arrangement.

Referring now to the drawing, there is illustrated a preferred embodiment of a stroller, generally designated 10, according to the present invention. The stroller 10 as shown in FIG. 1 is in the use position and is provided with a base "X" frame 12 having cross arms 14 and 16 pivotally coupled together at the midpoints thereof, as indicated at pivot point 18, for pivotal motion about a base frame pivot axis 19 (see FIG. 3) during movement in the lateral directions indicated by the arrow 20.

Figure 2:
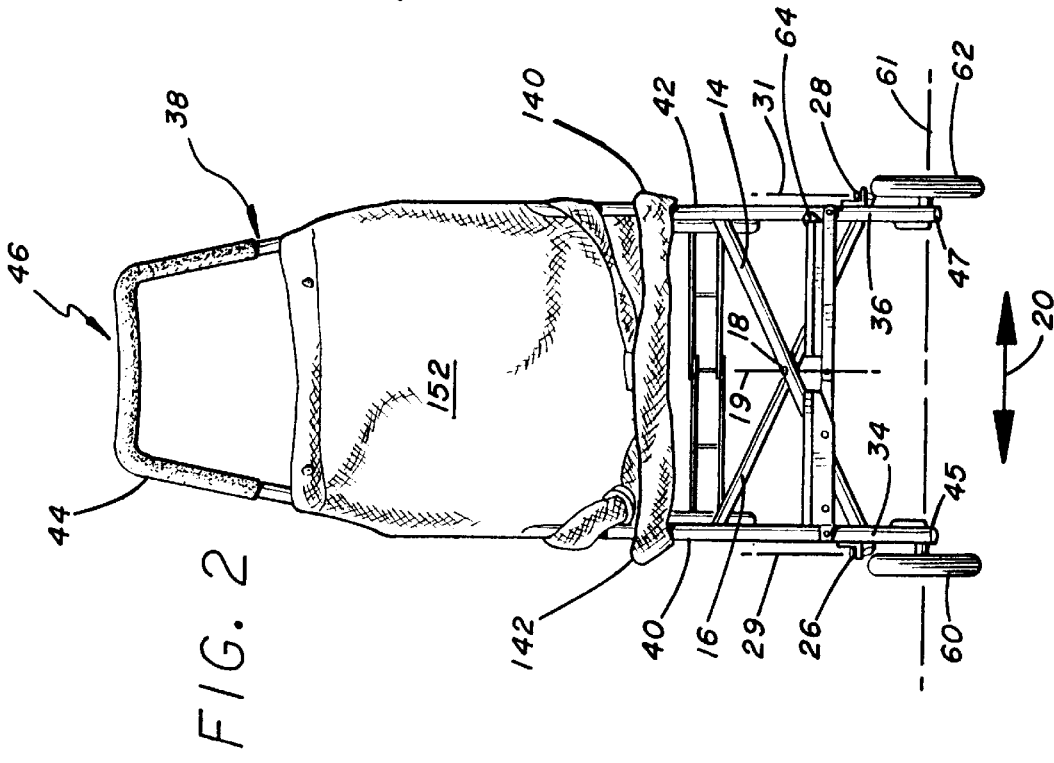
FIG. 2 is a front elevational view of the stroller arrangement in the unfolded or "in use" condition.

The forward ends 22 and 24 of the cross arms 14 and 16 are pivotally connected to laterally extending first legs 23 and 25 of forward, or front, angle brackets 26 and 28 for pivotal motion about pivot axes 29 and 31 (FIG. 2). In the use position shown in FIG. 1, the base "X" frame 12 is in an extended position and is generally oriented in a horizontal plane. The other, vertically extending, legs 30 and 32 of the angle brackets 26 and 28 are pivotally connected to lower end portions 34 and 36 of main seating support frame 38 for pivotal movement with respect thereto about pivot axes 33 and 35 (FIG. 10).

The main seating support frame 38 is of a generally inverted "U" shape. The open or lower ends 45 and 47 of the arms 40 and 42 thereof are in regions adjacent the arms 14 and 16 of the base "X" frame 12 to allow connection to the front angle brackets 26 and 28 as may best be seen in FIG. 2–4 and 6.

The upper or closed end 44 of the "U" shaped main seating support frame 38 is provided with adjustable means generally designated 46 for allowing the arms 40 and 42 to move towards and away from each other in the directions of the arrow 47 (FIG. 4) during the folding and opening of the stroller 10. The adjustable means 46 shown in the drawing is a "U" shaped nylon cap 48 having legs 54 and 56 extending over the upper ends 50 and 52 of the arms 40 and 42 and a cross member 58. The nylon has sufficient resiliency in the cross member 58 to flex and allow the desired movement of the arms 40 and 42. The cross member 58 is also the handle for pushing the stroller 10 when in use.

Other adjustable means may be used in place of the nylon cap 48 between the arms 40 and 42 to provide the necessary movement. Such means may be, for example, telescoping tubes, pivoting hinge means, a flexible plug (not shown) fitting into the bent and facing ends of arms 40, 42, or the like. The adjustable means 46 and the legs 40 and 42 together comprise the "U" shaped main seating support frame 38.

In the use position shown in FIG. 1, the main seating support frame 38 is at a desired angle to the base "X" frame 12 as indicated at "a", and the angle "a" may be varied as described hereinafter.

Front wheels 60 and 62 are rotatably mounted for rotation about axis 61 (FIG. 2) on the lower ends 45 and 47 of the arms 40 and 42 in regions spaced from the connection of the front angle brackets 26 and 28 to the arms 40 and 42 of the main seating support frame 38.

With particular reference to FIGS. 4, 6 and 10, an overcenter hinge means 64 is pivotally coupled to the lower ends 45 and 47 of the arms 40 and 42 of the main seating support frame 38 for pivotal movement about pivot a pair of axis such as axis 65, and a similar axis (not shown) is provided adjacent wheel 60 on the forward end 22 of the cross arm 14 (FIG. 1). The pivot of the overcenter hinge means 64 is indicated at pivot point 66 and is intermediate the lower ends 45 and 47 of the arms 40 and 42 and the forward ends 22 and 24 of the arms 14 and 16 of the "X" frame 12.

In the use position, the overcenter hinge means 64 is in an extended condition, and pivots at 66 for movement into the folded position as the lower ends 45 and 47 of the arms 40 and 42, and the forward ends 22 and 24 of the arms 14 and 16 of the "X" frame 12, move towards each other.

The overcenter action of the overcenter hinge means 64 aids in providing the desired and secured latched retention of the stroller 10 in the use position indicated in FIG. 1 while still allowing the folding and opening movement to take place.

An extension 64b of one of the members 64a of the overcenter hinge means 64 has a bend end 64c (see FIGS. 3, 6 and 10) which when lifted raises pivot point 66 above center to release the latch condition.

Referring now to FIGS. 1, 3–5, 7, and 9, the rear or back ends 70 and 72 of the arms 14 and 16 of the base "X" frame 12 are pivotally connected at pivot points 74 and 76 to legs 78 and 80 of rear or back brackets 82 and 84 for pivotal movement about pivot axes a pair of such as axis 83, and a similar axis is provided adjacent rear wheel 106 on the back end 72 of arm 16 of "X" frame 12. The other legs 86 and 88 of the rear angle brackets 82 and 84 are pivotally connected to the lower ends 90 and 92 of primary control rods 94 and 96 as indicated at 98 and 100 for rotation about pivot axes 101 and 103.

Rear wheels 104 and 106 are rotatably mounted on the lower ends 90 and 92 of primary control rods 94 and 96 as indicated at 108 and 110 for rotation about axis 111. An overcenter locking hinge means 112 is pivotally connected to the lower ends 90 and 92 of primary control rods 94 and 96, as indicated at pivot points 114 and 116, in spaced relationship to the pivotal connection of the rear angle brackets 82 and 84.

The pivot point 113 of the locking hinge means 112 is intermediate the lower ends 90 and 92 of the primary control rods 94 and 96 and allows movement of the rear ends of the arms 14 and 16 of the base "X" frame and the lower ends 90 and 92 of the primary control rods 94 and 96 towards and away from each other as the stroller is moved between the use and the folded positions. The locking hinge means 12 provides the desired secure, but releasable, bracing of the stroller in the open or use position.

Secondary control rods 118 and 120 are telescopically mounted on the forward or front ends 122 and 124 of primary control rods 94 and 96 for sliding motion thereon in the direction indicated by the arrow 123 in FIG. 4. Forward or outer ends of the secondary control rods 118 and 120 are pivotally coupled to connection brackets 126 and 128 as indicated at pivot points 130 and 132 for pivotal movement about axes 131 and 133. The brackets 126 and 128 are coupled to the arms 42 and 40, respectively, of the main seating support frame 38 in spaced relation to the overcenter hinge means 64.

Detents (hidden from view) are provided in the primary control rods 94 and 96 and spring loaded pins 141 and 143 are mounted on the secondary control rods 118 and 120 for selective engagement with the detents. By positioning the spring loaded pins 141 and 43 in different selected detents in primary control rods 94 and 96, the relative telescoping positions of the primary and secondary control rods serve to lengthen or shorten the distance between rear angle brackets 82, 84 and connection brackets 126, 128.

When the telescoping primary and secondary control rods are further extended, the seat support 150 tilts upwardly and rearwardly, while the back support 152, i.e., the main seating support frame 38, tilts upwardly and forwardly.

Thus, in a preferred embodiment, in a fully extended telescopic relationship between the primary and secondary control rods, the seat support 150 and back support 152 are at substantially right angles to one another, defining an upright position for the person being transported on the stroller 10.

On the other hand, when the spring loaded pins 141 and 43 engage different detents, so that the telescoping primary and secondary control rods are in a relatively retracted relationship, the seat support 150 tilts downwardly and forwardly, while the back support 152 tilts rearwardly and downwardly, thereby increasing the angle between the seat portion 150 and the back portion 152, defining a recumbent position for the person being transported by the stroller. The latter recumbent position would be selected, for example, for allowing the person being transported to be in a more relaxed position. This latter position also shifts the center of gravity of the person being transported rearwardly, and this position may be desired when riding over obstacles and/or going down curbs and the like.

Outer ends 140 and 142 of the secondary control rods 118 and 120 extend forwardly of the arms 42 and 40, respectively, of the main seating support frame 38 and provide the connection for the seat support 150. The seat support 150 may be cloth, plastic, or any flexible material suitable for the purpose. The back support 152 which may also be cloth, plastic, or some other desired flexible material, is mounted on the arms 40 and 42 of the main seating support frame 38.

As the movement in the direction of the arrow 123 occurs, the angle "a" changes, and the seat support 150 and back support 152 tilt and change the center of gravity of the person sitting in the stroller 10. This tilting feature in addition to the compact folding of the structure, allows for greater comfort and utility of the stroller 10.

Foot supports 160 and 162 may be mounted on the overcenter hinge means 64, one foot support being mounted on each hinging half of the overcenter hinge means 64. Advantageously, the person's leg weight on the foot supports 160, 162 ensure a solid latched condition of the overcenter hinge means 64.

As shown in the drawing of FIGS. 11–13, the stroller 10 may be folded in two directions: one in which the main seating support frame moves toward the base "X" frame 12; and the other in which the "X" frame 12 comes together laterally and the lower ends of arms 40 and 42 of the main seat support frame 38 move towards each other. Such two directional folding provides a very compact folded configuration for ease of storage and handling.

The folding procedure is very simple: 1) raise handle 64c of the front overcenter hinge means 64; 2) kick forwardly in the vicinity of pivot point 113 of overcenter hinge means 112; and 3) push down on the cross member 58 of the main seating support frame 38. The reverse procedure unfolds the stroller arrangement. Further, the unique combination of structural elements providing the folding and tilting action above-described allows a lightweight stroller 10 that is also sufficiently rugged to withstand the use to which the stroller 10 is subjected.

This concludes the description of the preferred embodiments of the present invention. Those skilled in the art may find many variations of the invention as above described and as shown on the accompanying drawing. Such person skilled in the art may adapt the principles taught herein to other structures while still practicing the present invention.

What is claimed is:

1. A stroller arrangement, comprising:
   an "X" frame base having a pair of cross elements with front ends and rear ends;
   a main seating support frame pivotally coupled to said front ends and comprising a back support;
   a primary support structure pivotally coupled to said rear ends and extending forwardly to be pivotally coupled to said main seating support frame and comprising a seat support, and said primary support structure further comprises:
      an elongated telescoping arrangement having an outer tubular member and an inner member slidable within said outer tubular member, one of said inner and outer telescoping members being pivotally coupled to said main seating support frame, and the other of said telescoping members being pivotally coupled to said rear ends of said cross elements, and
      an indexing mechanism for selectively incrementally changing the length of the telescoping arrangement between the pivotal connection at the main seating support frame and the pivotal connection at the rear ends of the cross elements,
   a releasable rigid latch maintaining said cross elements angularly displaced from one another; whereby
   upon release of said rigid latch, said cross elements may be brought together laterally to collapse said "X" frame base and fold said main seating support frame and said primary support structure against one another and against said collapsed "X" frame base;
   coupling devices for maintaining said back and seat supports at a relative angle with respect to each other of approximately 90° when said stroller arrangement is in use and said rigid latch is maintaining said cross elements angularly displaced from one another; and,
   each of said coupling devices comprises an indexing mechanism for selectively incrementally changing the length of said primary support structure, thereby varying the angle between said seat support and said back support, defining a range of seating positions from relatively upright to relatively recumbent.

2. The stroller arrangement as claimed in claim 1, wherein:
   said primary support structure is extendable and retractable for changing the distance between said pivotal coupling to said rear ends and to said main seating support frame, thereby varying the angle between said seat support and said back support, defining a range of seating positions from relatively upright to relatively recumbent.

3. A stroller arrangement, comprising:
   an "X" frame base having a pair of cross elements with front ends and rear ends;
   a main seating support frame pivotally coupled to said front ends, said main seating support frame comprising a back support;
   a primary support structure pivotally coupled to said rear ends and extending forwardly to be pivotally coupled to said main seating support frame, said primary support structure comprising a seat support; and
   coupling devices for maintaining said back and seat supports at a relative angle with respect to each other of approximately 90° when said stroller arrangement is in use, and said coupling devices comprising an indexing mechanism for selectively changing the length of said primary support structure to vary the angle between said seat support and said back support.

4. A stroller arrangement, comprising:
   an "X" frame base having a pair of cross elements with front ends and rear ends;
   a main seating support frame pivotally coupled to said front ends, said main seating support frame comprising a back support;
   a primary support structure pivotally coupled to said rear ends and extending forwardly to be pivotally coupled to said main seating support frame, said primary support structure comprising a seat support; and
   an indexing mechanism for selectively incrementally changing the length of said primary support structure between the pivotal connection at the main seating support frame and the pivotal connection at the rear ends of the cross elements, thereby varying the angle between said seat support and said back support, defining a range of seating positions from relatively upright to relatively recumbent.

5. The stroller arrangement as claimed in claim 4, comprising:
   coupling devices for maintaining said back and seat supports at a relative angle with respect to each other of approximately 90° when said stroller arrangement is in use.

6. A stroller arrangement, comprising:
   an "X" frame base having a pair of cross elements with front ends and rear ends;
   a back support frame pivotally coupled to said front ends, said back support frame comprising a back support; and
   a seat support structure pivotally coupled to said rear ends and extending forwardly to be pivotally coupled to said back support frame; and wherein
   said cross elements may be brought together laterally to collapse said "X" frame base and fold said back support frame and said seat support structure against one another and against said collapsed "X" frame base and,
   an indexing mechanism for selectively incrementally changing the length of said seat support structure, thereby varying the angle between said seat support structure and said back support, defining a range of seating positions from relatively upright to relatively recumbent.

7. A stroller arrangement, comprising:
   an "X" frame base having a pair of cross elements with front ends and rear ends;
   a back support frame pivotally coupled to said front ends, said back support frame comprising a back support; and
   a seat support structure pivotally coupled to said rear ends and extending forwardly to be pivotally coupled to said back support frame; and wherein
   said cross elements may be brought together laterally to collapse said "X" frame base and fold said back support frame and said seat support structure against one another and against said collapsed "X" frame base and, said seat support structure is extendable and retractable for changing the distance between said pivotal coupling to said rear ends and to said back support frame, thereby varying the angle between said seat support and said back support, defining a range of seating positions from relatively upright to relatively recumbent.

8. The stroller arrangement as claimed in claim 6, comprising:

coupling devices for maintaining said back and seat supports at a relative angle with respect to each other of approximately 90° when said stroller arrangement is in use.

9. A stroller arrangement, comprising:

a laterally collapsible frame base having a front end and a rear end;

a back support frame having a front end pivotally coupled to said base front end, and having a rear end defining a stroller handle; and a seat support having a rear end pivotally coupled to said base rear end, and having a front end pivotally coupled to said back support frame between said back support frame front and rear ends and, an indexing mechanism for selectively incrementally changing the length of said seat support, thereby varying the angle between said seat support and said back support frame, defining a range of seating positions from relatively upright to relatively recumbent.

10. The stroller arrangement as claimed in claim 9, wherein:

said frame base comprises cross elements which may be pivotally brought together laterally to collapse said frame base and fold against said back support frame and said seat support.

11. The stroller arrangement as claimed in claim 10, comprises:

a releasable rigid latch maintaining said cross elements angularly displaced from one another; whereby upon release of said rigid latch, said cross elements may be brought together laterally to collapse said frame base and fold against said back support frame and said seat support.

12. The stroller arrangement as claimed in claim 9, comprising:

coupling devices for maintaining said back support frame and said seat support at a relative angle with respect to each other of approximately 90° when said stroller arrangement is in use.

13. The stroller arrangement as claimed in claim 9, wherein:

said seat support is extendable and retractable for changing the distance between said pivotal coupling at said frame base and said back support frame, thereby varying the angle between said seat support and said back support frame, defining a range of seating positions from relatively upright to relatively recumbent.

* * * * *